Patented Mar. 30, 1948

2,438,551

UNITED STATES PATENT OFFICE 2,438,551

CHEWING GUM

Edward P. Fenimore, Drexel Hill, Pa., assignor to Bowman Gum, Inc., Philadelphia, Pa., a corporation of Pennsylvania No Drawing. Application May 13, 1940, Serial No. 334,903

9 Claims. (Cl. 99—135)

1

This invention relates to the production of chewing gum, and more particularly to a composition suitable for use as a chewing gum base.

This application is in part a continuation of my application Serial No. 285,135, filed July 18, 1939, now abandoned.

Chewing gum base adapted to be mixed with sugar and flavoring material for the production of chewing gum generally comprises a mixture of materials constituting, respectively, rubber, fat or wax, resinous and filler constituents. Of these various constituents, the resinous one is generally highly determinative of the properties of the final gum, and to a large extent the chewing characteristics of the gum and its permanence are largely dependent upon the nature of the resinous content.

It has been proposed heretofore to use the glyceryl ester of rosin, generally known as ester gum, as an ingredient in chewing gum base. This material is generally objectionable in that it is characterized by a woody taste and lack of permanence because of its great tendency toward absorption of oxygen. It has been proposed to overcome the objectionable odor and taste by protracted esterification of rosin, blowing steam through the product at a temperature about 150° C. and finally neutralization of the last traces of acidity by treatment with such alkaline earths as calcium or magnesium carbonates. However, these treatments do not eliminate the second objectionable characteristic, and it is known that the relatively short life of chewing gum made from ester gum is principally due to the absorption of oxygen by its ester gum constituent.

In accordance with the present invention, I have discovered that the foregoing objections to ester gum are avoided and improved chewing gum bases are obtained by utilizing, either as a sole or substantial constituent of the resin part of the chewing gum base, a stabilized ester gum.

The stabilization referred to herein comprises hydrogenation accomplished either by the addition of hydrogen as such or by heat treatment, in known fashion, of rosin. In one alternative practice, the stabilized ester gum may be formed using as a starting point gum rosin, wood rosin or a more or less purified abietic acid. Hydrogenation may be effected in conventional fashion before esterification, or, alternatively, the ester gum may be first formed and then hydrogenated. It will be understood that the products of either of such processes are to be considered as falling within the designation of a hydrogenated ester.

2

Alternatively, the stabilization may be effected by the hydrogenation which occurs upon heat treatment of rosin. By such treatment in known fashion there apparently occurs hydrogenation of some portion of the rosin constituents with dehydrogenation of others. The result, just as in the case of the hydrogenation of rosin, is a stabilization against oxygen absorption and decrease of the odor and taste of esters formed therefrom.

The stabilized esters provided either by external hydrogenation as indicated above, or by internal hydrogenation resulting from heat treatment, are preferably either glyceryl or ethylene glycol esters. While the glyceryl ester is less expensive and is preferred, the ethylene glycol ester may be used as the equivalent. Both of these polyhydric alcoholic esters have the properties desirable for use in the base described below. The hydrogenation effected in any of the fashions indicated may be completed to a greater or less extent, depending upon the degree of stabilization which is desired.

It will be understood that where stabilization is referred to in this specification, there is meant the stabilization either by hydrogenation of the rosin or abietic acid, or of the ester by the use of hydrogen, or the heat treatment of rosin before esterification.

Specifically, the stabilization of ester gum renders it substantially odorless and tasteless when cold and slightly odorous, but pleasantly so, when warmed to the temperature of the mouth. The stabilized ester gum is no longer affected to any appreciable extent by oxygen, and the ester gum and the base formed thereof are permanent in their characteristics. The stabilized ester gum is soluble in suitable softening oils and has physical properties making it especially suitable for use in chewing gum.

A further advantage of the stabilized ester gum arises from the fact that stabilization will convert ordinary ester gum to a substantially colorless condition, thus permitting the production of delicate pastel shades in the finished product not ordinarily obtainable by the use of chewing gum bases which are dark in color, as are those produced by the use of ester gum.

Another important advantage arises from the fact that, in addition to lack of odor and taste, the stabilization of ester gum yields a product of sufficiently low melting point that it is unnecessary to temper the resin with mineral oil, as is the case when coumarone-indene resins are employed. The use of mineral oil for this purpose has been shown definitely to have an undesirable effect on the life of the gum.

When a stabilized rosin ester is used there is some tendency towards tackiness in the finished gum. This may be prevented by the addition of ethyl cellulose.

An oil or wax is also generally included as a constituent of the gum base and in accordance with the present invention, this oily or wax constituent is improved by substitution, for wax alone or for hydrogenated oil used alone or in combination with wax, or a saturated glyceryl ester such as glyceryl stearate, glyceryl laurate, or glyceryl palmitate, either alone or in combination with a wax such as candelilla wax.

Essentially, the chewing gum base prepared in accordance with the present invention comprises a rubber constituent, a resin including the stabilized ester gum, and a mixture of one or more oils, fats or waxes, together with conventional filler.

The rubber constituent of the base may be Pará rubber, rubber latex (unvulcanized or vulcanized to a slight extent), or any suitable rubbery material, such as jelutong, gutta siak, or the like. There may also be used rubber substitutes or synthetic rubbers such as, for example, isobutylene polymers or vulcanized linseed oil (known as factis). It is sometimes desirable to use a mixture of vulcanized or unvulcanized latex and mill-rolled rubber vulcanized to some degree.

The resin constituent of the base may comprise solely the stabilized ester gum or the stabilized ester gum in admixture with other suitable resins of types conventionally used, which are sufficiently free of odor and taste to be applied for this purpose. A material such as ethyl cellulose may be present to reduce tackiness.

The plasticizing agent may be any one or a mixture of oils, fats and waxes commonly used and well known to those skilled in the art, for example, paraffin wax, Japan or candelilla wax, or hydrogenated oil may be used. Better than hydrogenated oil is a mixture of candelilla wax with synthetic glyceryl tristearate.

As an example of a base prepared in accordance with the invention, there may be specifically cited a base comprising the following constituents:

| | Per cent |
|---|---|
| Latex (60% rubber solids) | 16 |
| Candelilla wax | 10 |
| Hydrogenated ester gum | 56 |
| Mineral filler | 18 |

A still better base has the following composition:

| | Per cent |
|---|---|
| Latex (60% latex) | 18 |
| Hydrogenated rosin ester | 44 |
| Paracoumarone resin | 7.5 |
| Candelilla wax | 6 |
| Glyceryl tristearate | 2.5 |
| Ethyl cellulose | 2 |
| Calcium carbonate | 20 |

The above percentages may vary considerably, depending upon the properties of the gum which are desired. The rubber constituent, for example, in the form of latex containing about 40% of water, may constitute from 5 to 20% of the base. The total wax constituent may vary from about 7 to 50%, depending upon the nature of the constituent used. For example, if candelilla wax is used in combination with glyceryl tristearate or with another saturated glyceryl ester such as any other glyceryl stearate, laurate or palmitate, the candelilla wax may be present in amounts from 2 to 15%, while the glyceryl ester may be present in amounts from 2 to 20%. Of course, it is possible to omit the glyceryl ester or to use the glyceryl ester without admixture with wax, but the best properties appear to result from the use of mixtures as just indicated, the total of the two varying from 7 to 50%.

If stabilized ester gum is used alone as the resinous constituent, the percentage may vary from about 30 to 60%. If used in combination with another resin such as paracoumarone resin (so-called coumarone, but actually usually a mixture of para-coumarone and para-indene resins), the total resinous constituent may vary from less than 30% to about 70%. When a stabilized rosin ester is used, the tendency toward tackiness may be reduced by adding from 0.5 to 5% of ethyl cellulose or another alkyl cellulose. In various compositions, however, the tackiness may be reduced to a satisfactory extent without the addition of a material such as ethyl cellulose.

If the base is to be used for the making of the usual stick gum, the percentage of mineral filler may be quite low, whereas in the case of base for bubble gum, an amount of filler in excess of 10% is generally desirable. Hence, the filler may vary from about 0 to 30%.

The use of pure glyceryl esters, such, for example, as synthetic glyceryl tristearate, improves the nature of the gum as compared with the mixtures of glyceryl esters of unknown composition generally designated as hydrogenated oils.

Considerable variation in the properties of the gum prepared from a base are obtained if vulcanization to some degree of the rubbery constituent is secured. Unvulcanized latex may be used, but improvement results with a tendency toward a somewhat harder and tougher gum if a proportion of vulcanized rubber is included. A partially vulcanized latex may be used, for example, or unvulcanized latex, or even partially vulcanized latex may be mixed with a proportion, for example up to 10%, of moderately vulcanized mill-rolled rubber. The vulcanization may be effected in the mill, or may be completed in the mixing of the constituents to form the base. To the extent that the percentage of vulcanization is increased, more glyceryl stearate or more hydrogenated rosin ester may be included to maintain a desirable softness.

A typical chewing gum made by the use of a base such as that indicated above may comprise constituents in the following proportions:

| | Percent |
|---|---|
| Gum base | 8 to 28 |
| Corn and cane sugar | 55 to 80 |
| Glucose and/or invert sugar | 12 to 20 |
| Flavoring oil | ¼ to 1 |

The improved type of base is pale in color, substantially odorless and tasteless until warmed, when the slight odor and taste then appearing are quite pleasant, and completely stable to oxidation, with the result that gum incorporating the improved base does not lose its desirable characteristics upon standing and, furthermore, does not lose its characteristics when subjected to prolonged chewing.

What I claim and desire to protect by Letters Patent is:

1. A chewing gum material containing a stabilized glyceryl rosin ester and an alkyl cellulose.
2. A chewing gum material containing a hydrogenated glyceryl rosin ester and an alkyl cellulose.

3. A chewing gum material comprising ethyl cellulose and a gum selected from the group consisting of resins, rubbers, and chicle.

4. A chewing gum material comprising a resin and ethyl cellulose.

5. A chewing gum material comprising a rubber and ethyl cellulose.

6. A chewing gum material comprising a rubber, a resin and ethyl cellulose.

7. A chewing gum material comprising a resin which normally imparts an objectionable tackiness to the base, and ethyl cellulose in an amount sufficient to substantially reduce the tackiness imparted by the resin.

8. A chewing gum material comprising a resin which normally imparts an objectionable tackiness to the base, and ethyl cellulose in an amount such as to yield a weight ratio of said resin to ethyl cellulose ranging from about 1 to 10 up to about 100 to 1.

9. A chewing gum material comprising ethyl cellulose, a rubber, and a modifying constituent selected from the group consisting of waxy materials, oily softening agents, and plasticizers for ethyl cellulose.

EDWARD P. FENIMORE.

REFERENCES CITED

The following references are of record in the file of this patent:

UNITED STATES PATENTS

| Number | Name | Date |
|---|---|---|
| 1,975,447 | Canning | Oct. 2, 1934 |
| 1,691,460 | Biddle | Nov. 13, 1928 |
| 1,315,246 | Snelling | Sept. 9, 1919 |
| 2,154,482 | Weber | Apr. 18, 1939 |
| 2,288,100 | Manson | June 30, 1942 |
| 1,402,817 | Weber | Jan. 10, 1922 |
| 1,534,930 | Dunham | Apr. 21, 1925 |
| 2,050,272 | Canning | Aug. 11, 1936 |
| 1,455,893 | Stockton | May 22, 1923 |